US012717945B2

(12) United States Patent
Fang et al.

(10) Patent No.: US 12,717,945 B2
(45) Date of Patent: Aug. 25, 2026

(54) REKEYING USING INDIRECTION LAYER FOR DYNAMIC KEY ID LOOKUP

(71) Applicant: Snowflake Inc., Bozeman, MT (US)

(72) Inventors: Yi Fang, Kirkland, WA (US); Chong Han, Bellevue, WA (US); Haoyu Li, Fremont, CA (US); Xinglian Liu, Redmond, WA (US); Nithin Mahesh, Kirkland, WA (US); Benedikt Schmidt, San Bruno, CA (US); Ankur Sharma, Berlin (DE); Lars Volker, Los Altos, CA (US); Yizhi Zhu, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 106 days.

(21) Appl. No.: 18/948,009

(22) Filed: Nov. 14, 2024

(65) Prior Publication Data

US 2026/0134121 A1 May 14, 2026

(51) Int. Cl.
*G06F 21/00* (2013.01)
*G06F 21/60* (2013.01)
*G06F 21/62* (2013.01)

(52) U.S. Cl.
CPC ........ *G06F 21/6209* (2013.01); *G06F 21/602* (2013.01)

(58) Field of Classification Search
CPC ........................... G06F 21/6209; G06F 21/602
See application file for complete search history.

(56) References Cited

U.S. PATENT DOCUMENTS

| | | | | |
|---|---|---|---|---|
| 5,682,428 | A * | 10/1997 | Johnson | G06Q 20/3829 713/165 |
| 6,389,541 | B1 * | 5/2002 | Patterson | H04L 63/08 705/56 |
| 10,257,175 | B2 * | 4/2019 | Thunuguntla | H04L 9/0872 |
| 11,762,846 | B1 * | 9/2023 | Atherton | G06F 16/27 713/193 |
| 2012/0036370 | A1 * | 2/2012 | Lim | H04L 63/06 713/189 |
| 2012/0266209 | A1 * | 10/2012 | Gooding | H04L 63/20 726/1 |
| 2014/0068254 | A1 * | 3/2014 | Scharf | H04L 9/0894 713/165 |
| 2017/0195119 | A1 * | 7/2017 | Roth | H04L 9/0822 |
| 2021/0271771 | A1 * | 9/2021 | Erofeev | H04L 9/14 |
| 2025/0024535 | A1 * | 1/2025 | Pan | H04W 76/14 |
| 2025/0031258 | A1 * | 1/2025 | Pan | H04W 76/14 |
| 2026/0012340 | A1 * | 1/2026 | Chakraborty | H04L 9/0891 |
| 2026/0081758 | A1 * | 3/2026 | Srinivasan | H04L 9/0822 |
| 2026/0081759 | A1 * | 3/2026 | Cheung | H04L 9/0822 |

* cited by examiner

*Primary Examiner* — Mahfuzur Rahman
(74) *Attorney, Agent, or Firm* — Schwegman Lundberg & Woessner, P.A.

(57) ABSTRACT

The subject technology stores an original file master key identifier (FMKID) in metadata associated with an encrypted file, the encrypted file including data. The subject technology determines that the encrypted file is to be re-encrypted based at least on a period of time since the original FMKID was stored. The subject technology re-encrypts the data using a new encryption key associated with a new FMKID. The subject technology generates a mapping from the original FMKID to the new FMKID. The subject technology stores the mapping in a metadata database, the mapping being associated with a re-encrypted file, the re-encrypted file including the re-encrypted data.

16 Claims, 9 Drawing Sheets

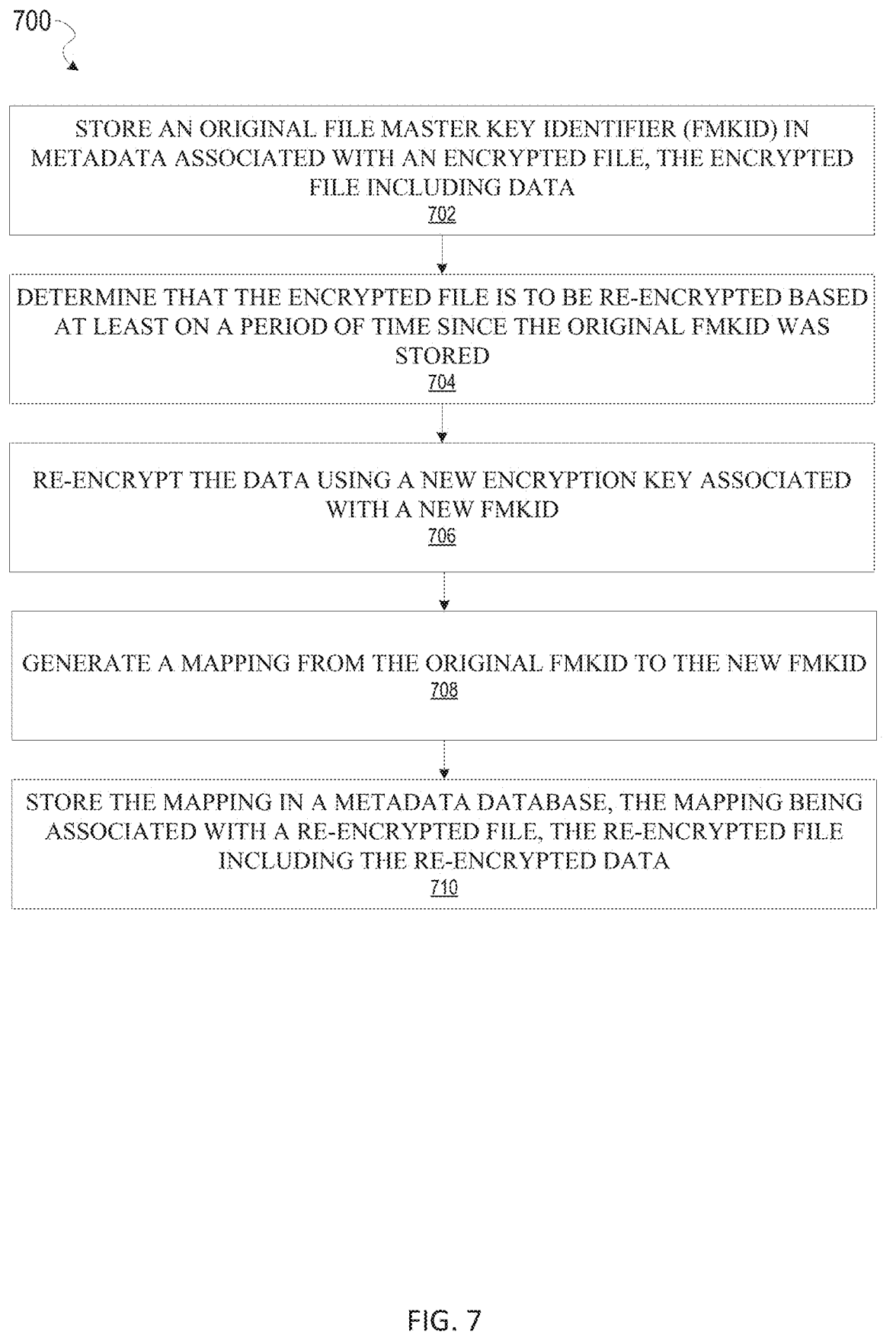

700

STORE AN ORIGINAL FILE MASTER KEY IDENTIFIER (FMKID) IN METADATA ASSOCIATED WITH AN ENCRYPTED FILE, THE ENCRYPTED FILE INCLUDING DATA
702

DETERMINE THAT THE ENCRYPTED FILE IS TO BE RE-ENCRYPTED BASED AT LEAST ON A PERIOD OF TIME SINCE THE ORIGINAL FMKID WAS STORED
704

RE-ENCRYPT THE DATA USING A NEW ENCRYPTION KEY ASSOCIATED WITH A NEW FMKID
706

GENERATE A MAPPING FROM THE ORIGINAL FMKID TO THE NEW FMKID
708

STORE THE MAPPING IN A METADATA DATABASE, THE MAPPING BEING ASSOCIATED WITH A RE-ENCRYPTED FILE, THE RE-ENCRYPTED FILE INCLUDING THE RE-ENCRYPTED DATA
710

FIG. 7

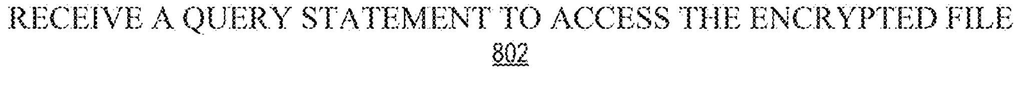
802
RETRIEVE THE ORIGINAL FMKID FROM THE METADATA
804
DETERMINE, USING THE MAPPING, THE NEW FMKID
806
ACCESS, USING THE NEW FMKID, THE RE-ENCRYPTED FILE
808
FIG. 8

REKEYING USING INDIRECTION LAYER FOR DYNAMIC KEY ID LOOKUP

TECHNICAL FIELD

Embodiments of the disclosure relate generally to cloud data platforms and, more specifically, to implementations of Data Manipulation Language (DML) for SQL (Structured Query Language) used to manage and manipulate data within a database system(s), and the like.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

A data platform may store database data (e.g., a table) in multiple storage units, which may be referred to as partitions, micro-partitions, and/or by one or more other names. A database may be organized as records (e.g., rows or a collection of rows) that each include one or more attributes (e.g., columns). In an example, multiple storage units of a database can be stored in a block and multiple blocks can be grouped into a single file. That is, a database can be organized into a set of files where each file includes a set of blocks, where each block includes a set of more granular storage units such as partitions. It should be understood that the terms "row" and "column" are used for illustration purposes and these terms are interchangeable. For example, data arranged in a column of a table can similarly be arranged in a row of the table.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

FIG. 7 is a flow diagram illustrating operations of a database system in performing a method, in accordance with some embodiments of the present disclosure.

FIG. 8 is a flow diagram illustrating operations of a database system in performing a method, in accordance with some embodiments of the present disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The subject technology advantageously provides the following improvements: 1) enabling computing advanced metadata (e.g., number of distinct values, the like), thereby improving read operation performance; 2) integrating bitsets in micro-partition files, thereby enabling leveraging storage management and optimization features such as encryption and caching.

Data security remains a concern for enterprises, particularly in environments where sensitive information undergoes encryption. Periodic rekeying serves as a mechanism to enhance data security by re-encrypting data with new encryption elements, replacing older elements that may have been compromised or are no longer secure. This process ensures that data remains protected even if an element is exposed.

Existing solutions often involve updating metadata files to reflect new encryption. This approach can lead to challenges, including race conditions when concurrent processes attempt to modify the same files. These race conditions can result in stale metadata, leading to data inaccessibility and potential security vulnerabilities. Additionally, the process of updating metadata files can be resource-intensive, requiring significant computational and storage overhead, particularly in large-scale data environments.

Embodiments of the subject technology manage encryption keys without modifying metadata files directly. By introducing a layer of indirection using a metadata store (e.g., Foundation DB), the system dynamically translates old key IDs to new key IDs during query execution. The subject technology avoids race conditions, maintains the immutability of metadata files, and simplifies the rekeying process, enhancing scalability and reducing storage overhead.

Figure 1:
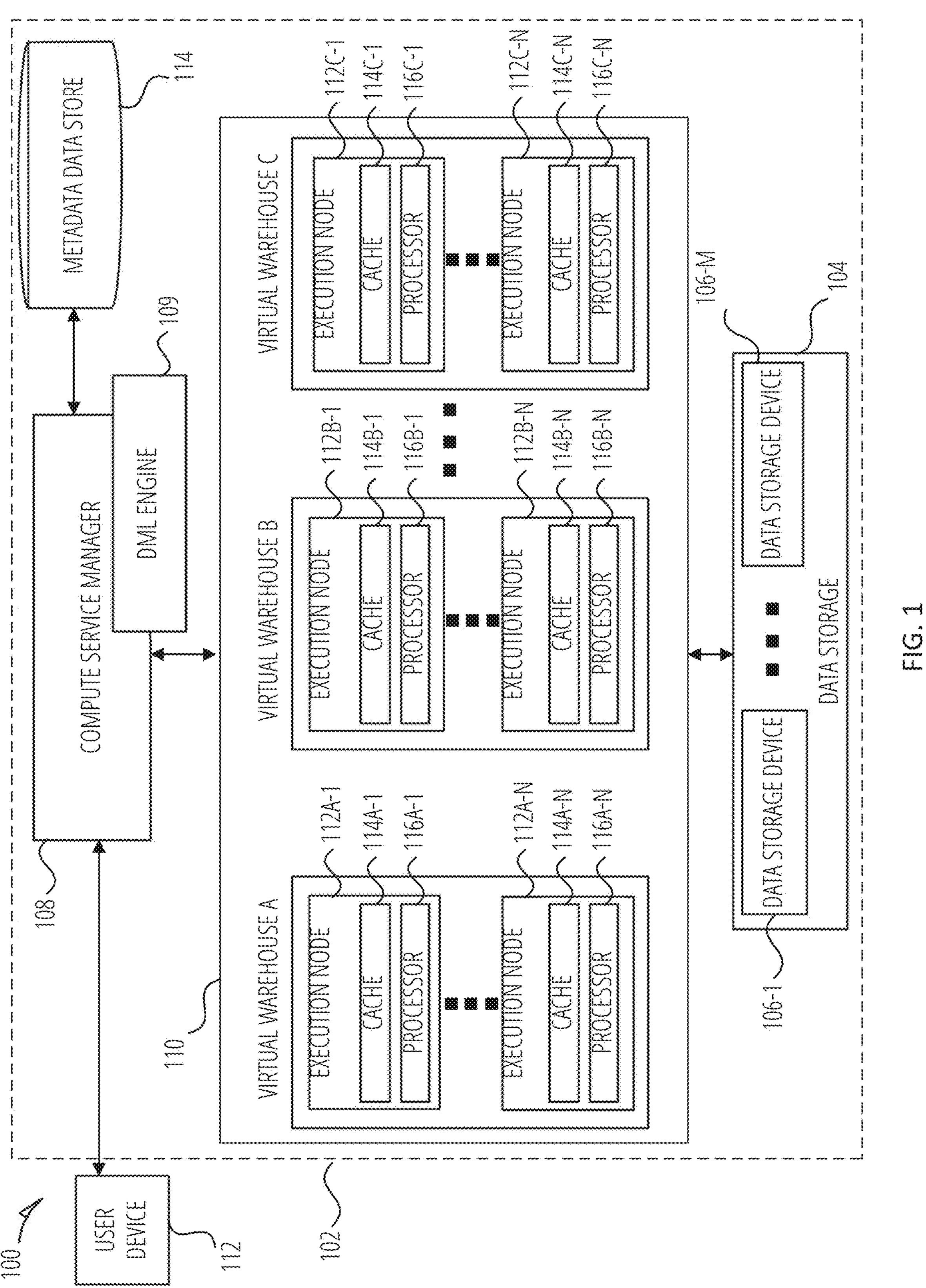
FIG. 1 illustrates an example computing environment that includes a data platform, in accordance with some embodiments of the present disclosure.

FIG. 1 illustrates an example computing environment 100 that includes a data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a three-tier architecture: a compute service manager 108 coupled to a metadata data store 114, an execution platform 110, and data storage 104. The data platform 102 hosts and provides data access, management, reporting, and analysis services to multiple client accounts. Administrative users can create and manage identities (e.g., users, roles, and groups) and use permissions to allow or deny access to the identities to resources and services. The data platform 102 is used for reporting and analysis of integrated data from one or more disparate sources including storage devices within the data storage 104. The data storage 104 comprises a plurality of computing machines and provides on-demand computer system resources such as data storage and computing power to the data platform 102.

The compute service manager 108 includes multiple services that coordinate and manage operations of the data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 114. The metadata data store 114 stores metadata pertaining to various functions and aspects associated with the data platform 102 and its users. The metadata data store 114 also includes a summary of data stored in data storage 104 as well as data available from local caches. Additionally, the metadata data store 114 includes information regarding how data is organized in the data storage 104 and the local caches.

As shown, the compute service manager 108 includes a DML engine 109 that is responsible for performing operations related to improving DML queries, including at least generating and maintaining delta files, bitsets, and related metadata, as discussed further herein. Further details of the operation of the DML engine 109 are discussed below.

The compute service manager 108 is also in communication with a user device 112. The user device 112 corresponds to a user of one of the multiple client accounts supported by the data platform 102. In some implementations, the compute service manager 108 does not receive any direct communications from the user device 112 and only receives communications concerning jobs from a queue within the data platform 102.

The compute service manager 108 is also coupled to the metadata data store 114. The metadata data store 114 stores metadata pertaining to various functions and aspects associated with the data platform 102 and its users. The metadata data store 114 also includes a summary of data stored in data storage 104 as well as data available from local caches. Additionally, the metadata data store 114 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution node 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution node 112B-1 to 112B-N; execution node 112B-1 includes a cache 114B-1 and a processor 116B-1; and execution node 112B-N includes a cache 114B-N and a processor 116B-N. Additionally, virtual warehouse C includes execution node 112C-1 to 112C-N; execution node 112C-1 includes a cache 114C-1 and a processor 116C-1; and execution node 112C-N includes an execution node 112C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG.

1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the data storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

Figure 2:
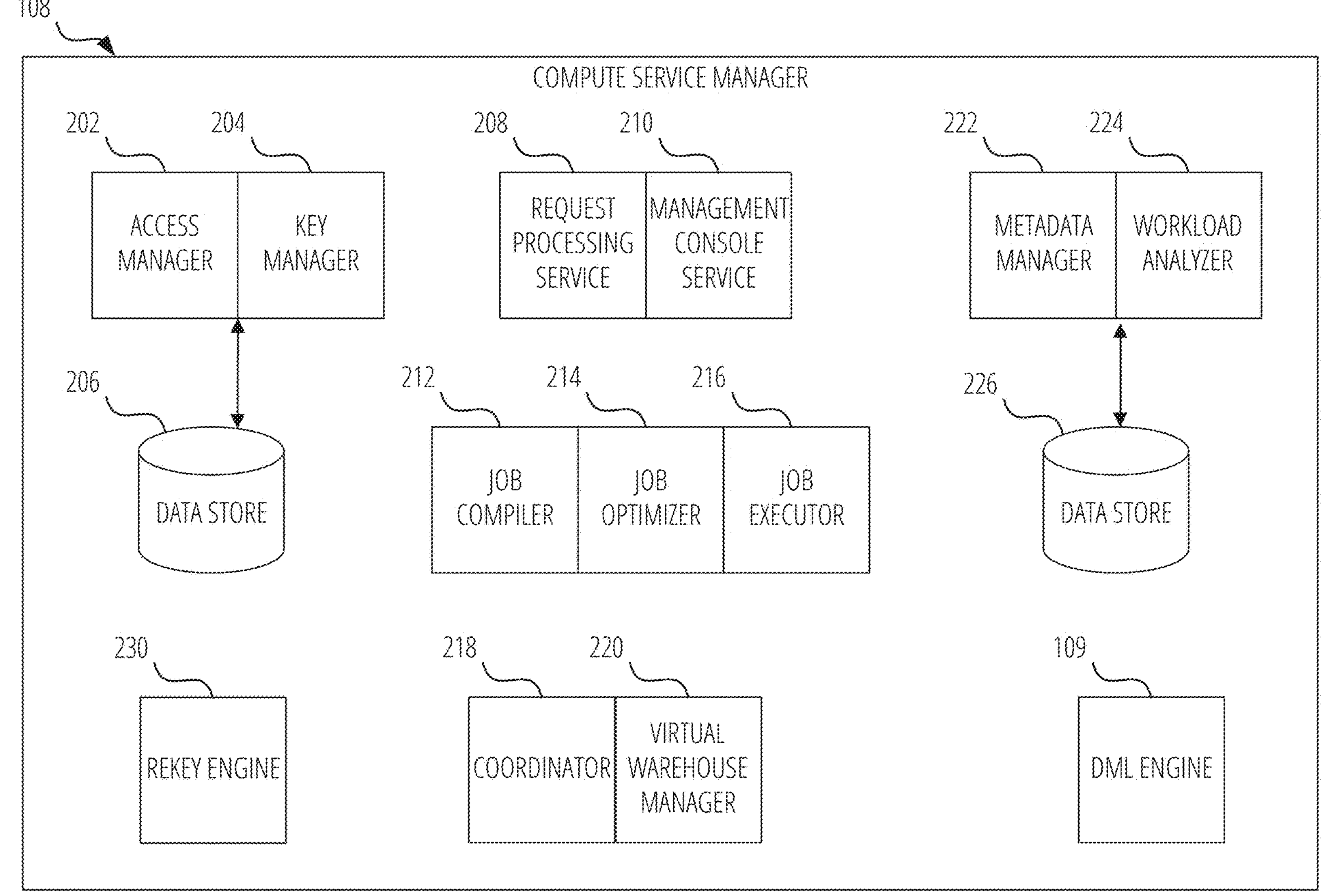
FIG. 2 is a block diagram illustrating components of a compute service manager of the cloud data platform, in accordance with some embodiments of the present disclosure

The compute service manager 108, metadata data store 114, execution platform 110, and data storage 104 are shown in FIG. 2 as individual discrete components. However, each of the compute service manager 108, metadata data store 114, execution platform 110, and data storage 104 may be implemented as a distributed system (e.g., distributed across multiple systems/platforms at multiple geographic locations). Additionally, each of the compute service manager 108, metadata data store 114, execution platform 110, and data storage 104 can be scaled up or down (independently of one another) depending on changes to the requests received and the changing needs of the data platform 102. Thus, in the described embodiments, the data platform 102 is dynamic and supports regular changes to meet the current data processing needs.

As mentioned further herein, terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file includes a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, the metadata data store 114 includes EP files (expression property files), where each of the EP files store a collection of expression properties about corresponding data. As mentioned before, EP files provide a similar function to an indexing structure into micro-partition metadata. Metadata may be stored for each column of each micro-partition of a given table.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform. In embodiments herein, each file includes data, which can be further compressed (e.g., using an appropriate data compression algorithm or technique) to reduce a respective size of such a file.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s).

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the data platform 102. For example, data store 226 may represent caches in execution platform 110, storage devices in data storage 104, the metadata data store 114, or any other storage device or system.

In addition, as mentioned above, the compute service manager 108 includes a DML engine 109 that is responsible for performing operations related to improving DML queries, including at least generating and maintaining delta files, bitsets, and related metadata, as discussed further herein. Further details regarding the functionality of the DML engine 109 are discussed below.

As further shown, the compute service manager 108 includes a rekey engine 230 performing operations for rekeying involving re-encrypting data that was previously encrypted with an older encryption key (e.g., older than 1 year) using a new encryption key. This process is performed periodically to enhance data security by rotating encryption keys. Rekeying is designed to improve data security without disrupting ongoing operations or requiring changes to metadata (e.g., EP files which contain metadata about the encrypted files). This approach allows for efficient key management and maintains backward compatibility.

Figure 3:
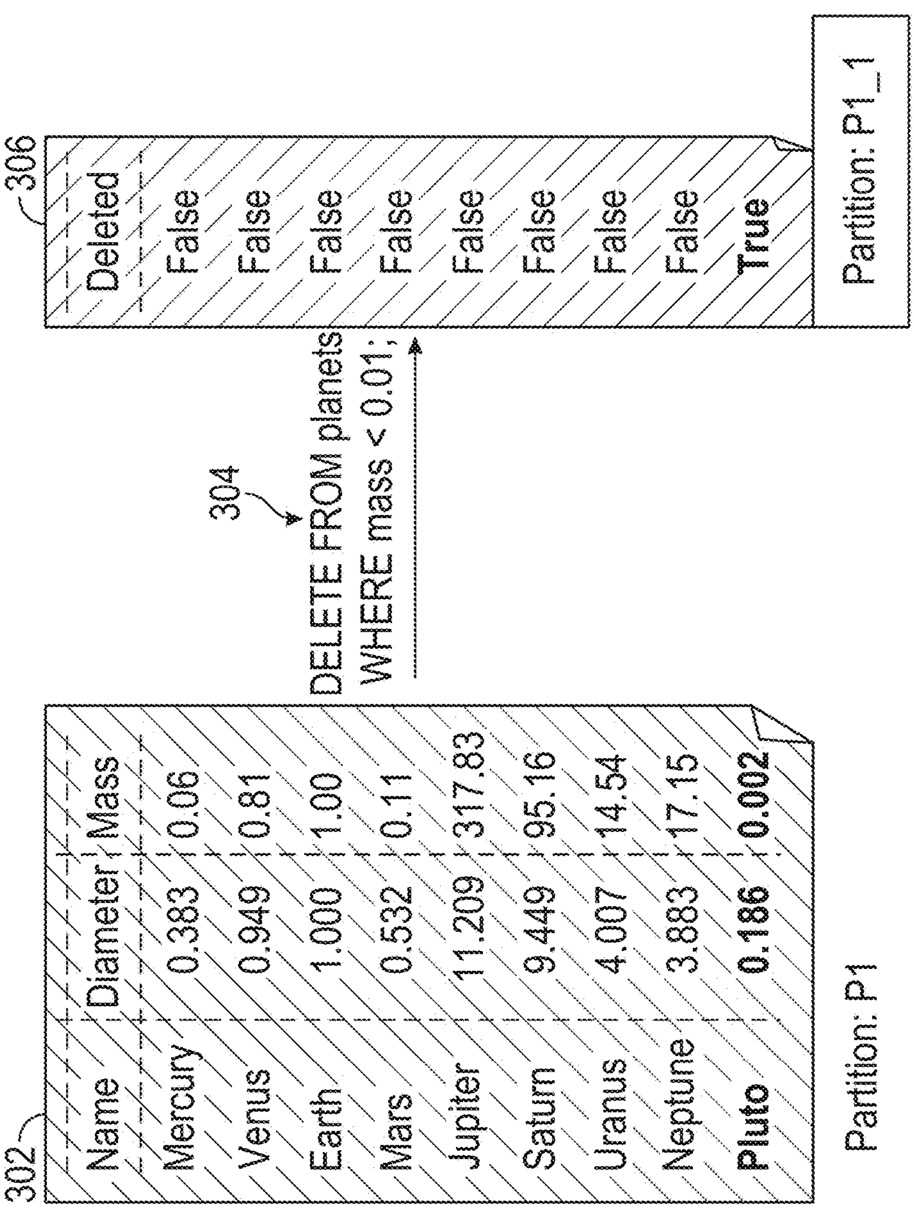
FIG. 3 illustrates an example of performing a delete operation with bitsets, in accordance with an embodiment of the subject technology.

FIG. 3 illustrates an example of performing a delete operation with bitsets, in accordance with an embodiment of the subject technology. In an implementation, DML engine 109 can perform at least some of the operations discussed below.

In the example of FIG. 3, file 302 is processed in view of query 304, in which the result of this query is represented by bitset 306. As shown, partition P1_1 includes bitset 306. Partition P1 can be understood as a logical concept which includes a set of rows, while a file (e.g., file 302) is stored on a disk or in an object store. In an example, a given partition (e.g., partition P1) can include one or two files.

In an example, file 302 includes data for a table of data including values for name, diameter, and mass, each of which is a separate column in each row of the table.

The subject technology introduces delta files, which are created by DMLs that delete and/or update rows. A delta file is associated with exactly one data file referred to as its root file, and stores the difference to that root file. A root file can have exactly zero or one active delta file, and chains of delta files, therefore, are not created. Instead, subsequent updates will replace an existing delta file with a new one.

The subject technology advantageously provides the following improvements: 1) enabling computing advanced metadata (e.g., number of distinct values, the like), thereby improving read operation performance; 2) integrating bitsets in micro-partition files, thereby enabling leveraging storage management and optimization features such as encryption and caching.

The following discussion relates to a logical layout for a delta file.

Figure 4:
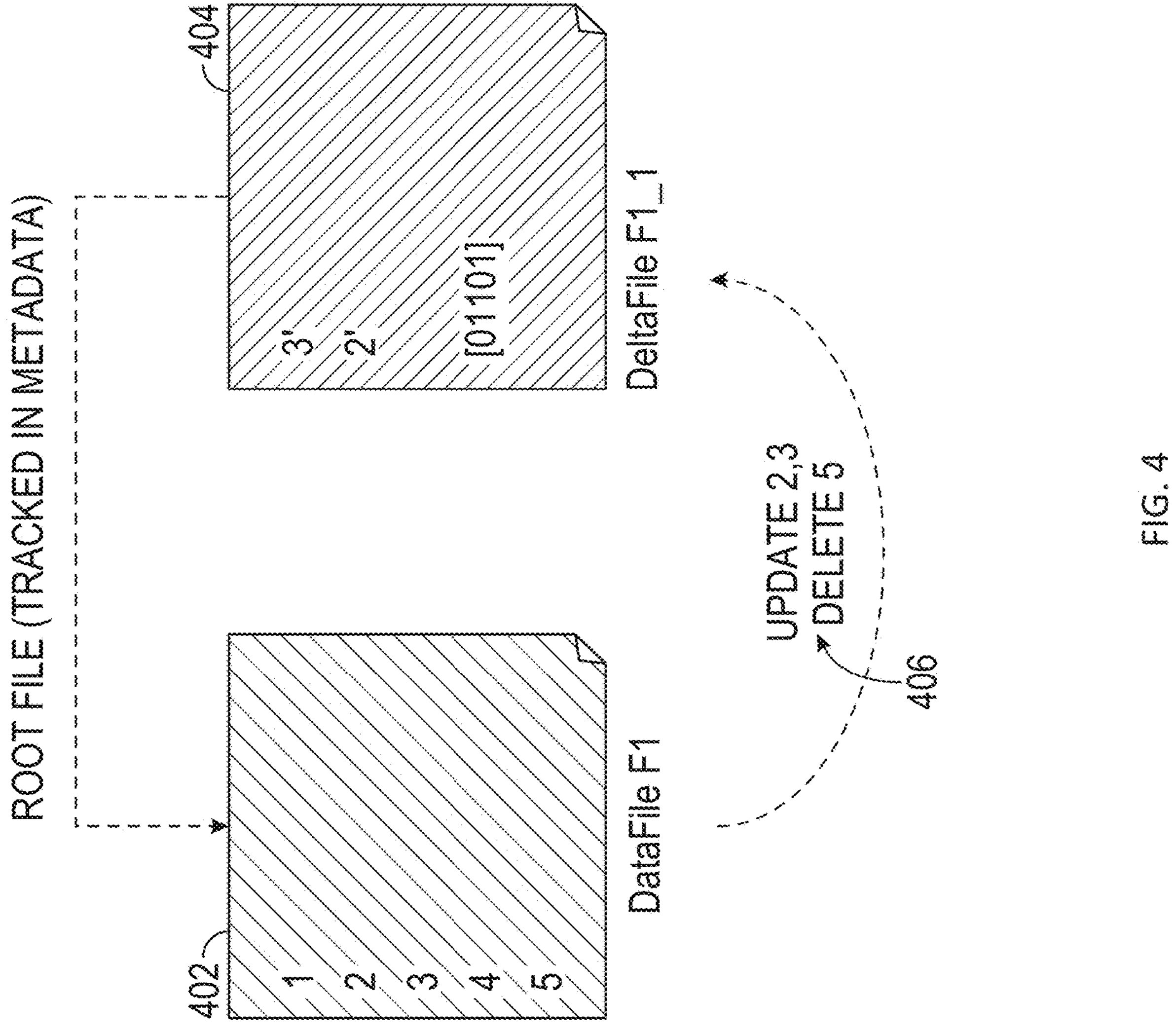
FIG. 4 illustrates an example of a logical layout of a delta file, in accordance with an embodiment of the subject technology.

FIG. 4 illustrates an example of a logical layout of a delta file, in accordance with an embodiment of the subject technology. In an implementation, DML engine 109 can perform at least some of the operations discussed below.

In the example of FIG. 4, root file 402 and delta file 404 are illustrated where delta file 404 is associated with root file 402 based on a set of queries 406 that includes a first query with an update statement and a second query with a delete statement for performing on root file 402. The root file 402, in this example, includes a set of rows, each row having a value (e.g., as included in a column).

In an implementation, a delta file (e.g., delta file 404) stores:

1. A bitset set to mark rows of its root file as unregistered, i.e., deleted or updated.
2. Optionally a set of rows that are new versions of updated rows of its root file (e.g., this could be left out if no rows were updated such as in a DELETE statement). The order of the updated rows is not specified, i.e., their original order from the root file is not maintained.

Figure 5:
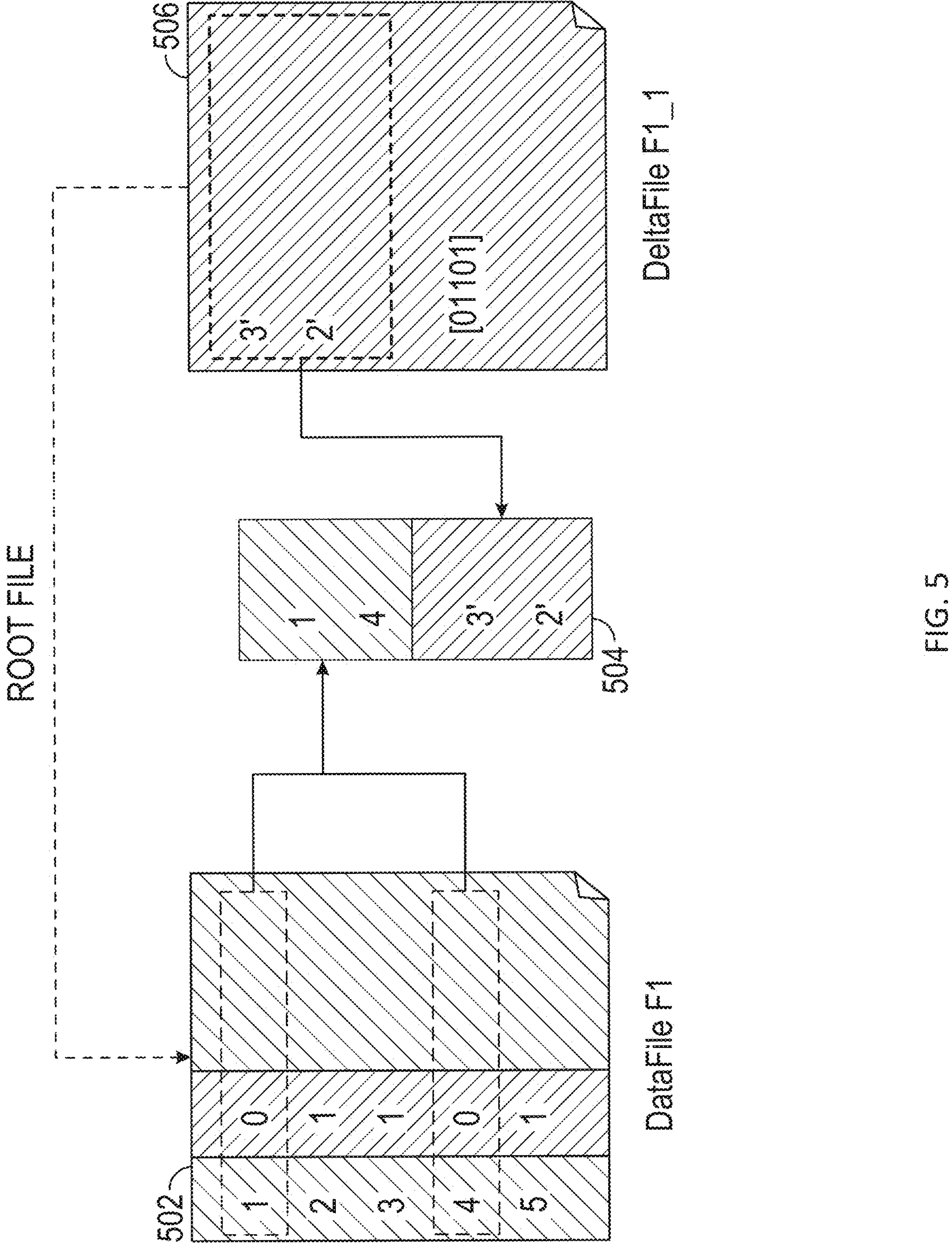
FIG. 5 illustrates an example of producing logical content of a delta file, in accordance with an embodiment of the subject technology.

FIG. 5 illustrates an example of producing logical content of a delta file, in accordance with an embodiment of the subject technology. In an implementation, DML engine 109 can perform at least some of the operations discussed below.

In an implementation, the delta file-to-root file relationship is tracked in metadata (e.g., EP metadata and the like) and not in the delta file, at least because physical file names are not fixed (e.g., can change in view of performing rekeying, replication). In the example of FIG. 5, a root file of delta file 506 corresponds to data file 502.

Since the delta file stores the differences from its root file, the combined partition, which includes the delta file combined with the root file, includes the same data as a data file that was created using a copy-on-write mechanism. Copy-on-write (CoW) refers to a data processing technique such that when a database needs to modify data (e.g., as part of executing a given query), instead of modifying the existing data, CoW creates a new copy of the data (e.g., table, partition, file, and the like) with the modifications.

The logical content of a delta file, such as logical content 504, can be constructed by scanning its root file and filtering the rows using the delta file's bitset and scanning the delta file's updated rows.

In an example, a combined partition includes the rows that are obtained by applying the delta file on top of the root file, i.e. it can include one file (root file only) or two files(root+delta). As mentioned herein, a combined partition is one that includes the two files, and a regular partition (or simply "partition") is one that is understood to only include one file (e.g., root file only).

Figure 6:
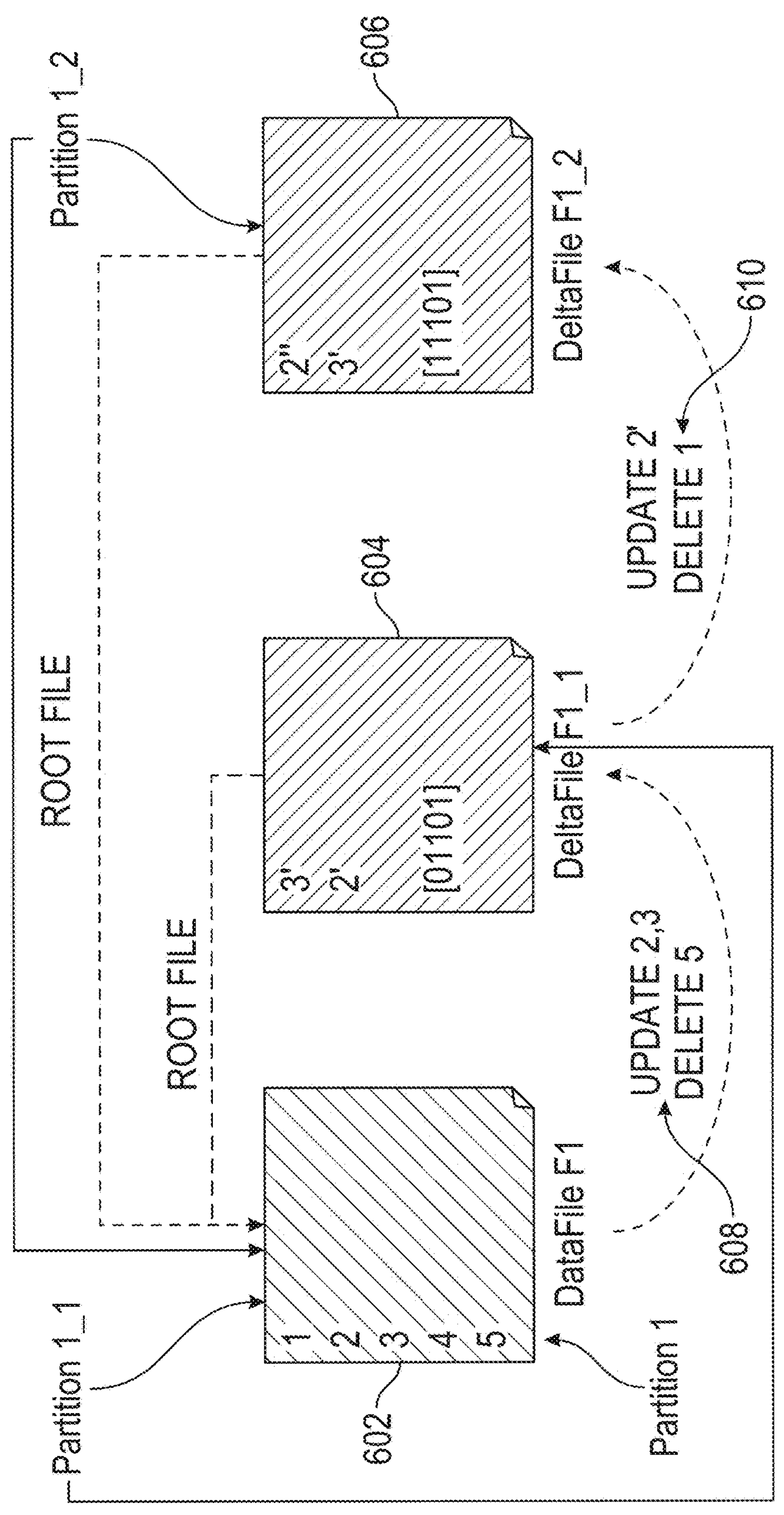
FIG. 6 illustrates an example of producing a delta file, in accordance with an embodiment of the subject technology.

FIG. 6 illustrates an example of producing a delta file, in accordance with an embodiment of the subject technology. In an implementation, DML engine 109 can perform at least some of the operations discussed below.

In FIG. 6, query 608 is executed on data file 602 to generate delta file 604. Subsequently, delta file 606 is generated based on query 610 being processed on the partition including root file (e.g., data file 602) and delta file 604.

A delta file (e.g., delta file 606) can be produced when a DML statement(s) (e.g., query 610) deletes or updates rows that are (logically) contained in a delta file (e.g., delta file 604). The new delta file (e.g., delta file 606) will inherit the root file, the bitset, and all updated rows from the updated delta file and apply all additional changes of the current DML on top, i.e., it can mark additional rows in the bitset and store additional updated rows. Updated rows of the updated delta file that are not modified are copied forward into the new delta file, resulting in a CoW-like update behavior between two delta files. These delta files (e.g., delta file 604 and delta file 606) are referred to further herein as stacked delta files.

As illustrated, a first partition (e.g., partition 1) includes data file 602, a second partition (e.g., partition 1_1) includes data file 602 and delta file 604, and a third partition (e.g., partition 1_2) includes data file 602 and delta file 606.

An "EP file patch" refers to a process used to update metadata files (e.g., EP files), with new encryption identifiers after rekeying operations. When data is re-encrypted with a new identifier, the EP file patch updates the metadata to reflect the new ID, ensuring that the subject system can correctly access and decrypt the data using the current encryption identifier.

This EP file patch involves modifying the EP files to replace the old ID with the new one. This can introduce challenges, such as violating the immutability of EP files and creating potential race conditions when EP files are concurrently accessed or consumed. The EP file patch process can also be resource-intensive, requiring significant time and computational effort to update relevant files.

Embodiments of the subject technology enable managing key IDs without directly modifying metadata files involves using a technique called a "layer of indirection." This approach allows for the management of key IDs in a way that avoids altering the original metadata files, which can be complex and error-prone.

In this context, a metadata store (e.g., metadata data store 114), such as a database (e.g., Foundation DB, and the like), holds a mapping between old and new encryption identifiers. When data needs to be accessed or re-encrypted, the system uses this mapping to determine the correct encryption identifier without changing the metadata files themselves. This process ensures that the metadata files remain immutable, meaning they do not need to be rewritten or patched every time an identifier is updated.

The layer of indirection works by storing the old identifier in the metadata files. When a query or operation requires access to the data, the system dynamically translates this old identifier to the new identifier using the mapping in the metadata store. This translation occurs during the execution of queries, ensuring that the current encryption identifier is used without modifying the original metadata files.

This approach helps prevent race conditions, where simultaneous operations could lead to inconsistencies, and enhances scalability by reducing the need for frequent metadata updates. The method also minimizes storage overhead, as the metadata files do not need to be duplicated or extensively modified.

The subject system allows stale File Master Key IDs (FMKIDs) to remain in EP files while utilizing the Foundation Database (FDB) as an intermediary layer to obtain the most current key information when given a potentially outdated FMKID. This approach introduces a layer of indirection that enables the retrieval of up-to-date key data without modifying the EP files directly.

The File Master Key ID (FMKID) stored in an EP file for a given file is defined as the original FMKID assigned when the file was first registered in the table. This FMKID remains constant.

When the original encryption key is retired and the file is re-encrypted, a Copy Service generates a new physical file with a different full file path, prefixed by the new FMKID. In an implementation, such a copy service is provided by rekey engine 230. To manage this change, a mapping is maintained in the Foundation Database (FDB) (e.g., provided by metadata data store 114) that links the persisted FMKID to the new FMKID associated with the new encryption key. Importantly, the outdated FMKID in the EP files remains unaltered.

A new REKEYED_TO slice is introduced in the KeyDPO (Data Persistence Object) to track the mapping between the persisted FMKID and the most recent FMKID used for file encryption. The schema of this REKEYED_TO slice includes a KEY_ID field, which corresponds to the FMKID.

This new slice serves as a lookup mechanism to efficiently retrieve the current key information when given a potentially outdated FMKID.

The new FMKID enables lookup in the primary slice to retrieve the actual key, maintaining consistency with current practices.

A new field called PERSISTED_KEY_ID is added to the KeyDPO, which will be stored in all slices with values set to DPOSlice.ALL. This field serves two primary purposes: maintaining the REKEYED_TO slice and performing reverse lookups. During the rekeying process, both the old and new keys will share the same PERSISTED_KEY_ID value. However, only the new key will have an entry in the REKEYED_TO slice mapping.

Backfilling is not necessary for this implementation. If the PERSISTED_KEY_ID field is not populated, the subject system will use the KEY_ID as the PERSISTED_KEY_ID. For subsequent rekeying operations, the PERSISTED_KEY_ID of the new key generation is assigned the value of the old key's PERSISTED_KEY_ID.

This approach allows for efficient key management and lookup while maintaining backward compatibility. It also facilitates the transition to the new rekeying process without requiring extensive modifications to the existing database structure.

The following relates to file and mapping life cycles.

The subject system (e.g., rekey engine 230) persists the mapping by adding a new Data Persistence Object (DPO) to the REKEYED_TO slice after the Copy Service notifies that rekeying is complete. The Copy Service then schedules the deletion of old files encrypted with the old key after (7+buffer) days, allowing for long-running foreground queries that may still be accessing these files.

During the (7+buffer) day period, there are two scenarios for query execution:

1. Foreground queries that started before the mapping was persisted continue to read the old files encrypted with the old key.
2. Queries initiated after the mapping is persisted use the new mapping to read from the newly encrypted files.

This approach is feasible because two physical copies of the files exist during this transition period. After (7+buffer) days, all queries should utilize the mapping to read from the new encrypted files, as the old files will have been deleted.

For subsequent rekeying operations on the same file, the process remains consistent. A new mapping is added from the previous key's PERSISTED_KEY_ID to the new FMKID after the Copy Service completes its task. Notably, this process does not create a chain of key mappings. Instead, it maintains a direct mapping from the original persisted FMKID to the latest FMKID, effectively overwriting the previous mapping in the PERSISTED_KEY_ID slice.

To ensure consistency in foreground queries, it is advantageous to fetch the key mapping indirection from the Foundation Database (FDB) once during scanset generation. This approach helps avoid potential inconsistencies in mapping for the same file that could arise due to mapping updates occurring between multiple lookups. Notably, despite potential inconsistencies, both keys remain usable for reading the files during the transition period.

The following relates to retrieving the latest FMKID.

Given that the File Master Key ID (FMKID) stored in EP files may be outdated, it may be necessary to retrieve the most current FMKID for two primary purposes: constructing the full file path and obtaining the actual key from the KeyDPO (Key Data Persistence Object).

The subject system (e.g., rekey engine 230) reads file metadata and creates a File object from an EP file in GS (Global Services provided by compute service manager 108) without translating stored persisted FMKIDs.

During query compilation, a translation of the persisted FMKID is performed before retrieving all keys that are required to execute the query. This enables batching the lookups to improve performance.

However, since the latest FMKID is loaded at a lower level that is frequently accessed during query compilation, it is crucial to maintain performance.

To achieve this, a caching mechanism is introduced to avoid constant FDB lookups, which is discussed further below.

To optimize performance and reduce the need for frequent Foundation Database (FDB) lookups, a Key Cache is provided to store mappings between persisted FMKIDs and their corresponding latest FMKIDs.

This cache can be implemented as an additional LoadingCache within the existing KeyManager structure.

To maintain data freshness, cache entries can be set to expire after (7 days−buffer), aligning with the file deletion schedule managed by the Copy Service.

To further optimize the subject system, an additional cache mapping accountId to a boolean value can be implemented. This cache would indicate whether an account has Table Master Keys (TMKs) that have undergone rekeying. The cache can be populated by checking if the REKEYED_TO slice is empty. For accounts where rekeying is not enabled, the translation process becomes unnecessary, and the subject system can directly return the persisted FMKID without additional lookups.

When the Copy Service successfully completes its operation, the mapping update is persisted. However, if a file is missed during this process, a latest FMKID for that file is provided, potentially resulting in data becoming unreachable.

In an implementation, all key information is available in the Foundation Database (FDB). To mitigate the risk of unreachable data, a special parameter can be added to return a specific FMKID set in the parameter as a recovery strategy in unexpected scenarios.

An example parameter format is a String serialized by a Map<Long, List>, where:

The key is the FMKID

The value is a list of file shortnames using that FMKID

Additionally, a system function can be provided to allow manual rekeying of specific files. This function would accept the file shortname, old FMKID, and new FMKID as parameters.

These measures provide a robust recovery mechanism and manual intervention capability, enhancing the system's resilience to potential rekeying issues.

FIG. 7 is a flow diagram illustrating operations of a database system in performing a method 700, in accordance with some embodiments of the present disclosure. The method 700 may be embodied in computer-readable instructions for execution by one or more hardware components (e.g., one or more processors) such that the operations of the method 700 may be performed by components of data platform 102. Accordingly, the method 700 is described below, by way of example with reference thereto. However, it shall be appreciated that method 700 may be deployed on various other hardware configurations and is not intended to be limited to deployment within the data platform 102.

At operation 702, rekey engine 230 stores an original file master key identifier (FMKID) in metadata associated with an encrypted file, the encrypted file including data.

At operation 704, rekey engine 230 determines that the encrypted file is to be re-encrypted based at least on a period of time since the original FMKID was stored. In an embodiment, the period of time comprises a particular number of days and a buffer period of time.

At operation 706, rekey engine 230 re-encrypts the data using a new encryption key associated with a new FMKID.

At operation 708, rekey engine 230 generates a mapping from the original FMKID to the new FMKID.

At operation 710, rekey engine 230 stores the mapping in a metadata database, the mapping being associated with a re-encrypted file, the re-encrypted file including the re-encrypted data.

In an embodiment, for a subsequent rekeying operation on the re-encrypted file, updating the mapping to directly link the original FMKID to a latest FMKID, without creating a chain of key mappings.

FIG. 8 is a flow diagram illustrating operations of a database system in performing a method 800, in accordance with some embodiments of the present disclosure. The method 800 may be embodied in computer-readable instructions for execution by one or more hardware components (e.g., one or more processors) such that the operations of the method 800 may be performed by components of data platform 102. Accordingly, the method 800 is described below, by way of example with reference thereto. However, it shall be appreciated that method 800 may be deployed on various other hardware configurations and is not intended to be limited to deployment within the data platform 102.

At operation 802, an execution node receives a query statement to access the encrypted file.

At operation 804, the execution node retrieves the original FMKID from the metadata.

At operation 806, the execution node determines, using the mapping, the new FMKID. In an embodiment, the mapping is stored in a particular slice of a key data persistence object. In an embodiment, the key data persistence object includes a persisted key ID, where the persisted key ID is utilized to maintain the particular slice and perform a reverse lookup operation.

At operation 808, the execution node accesses, using the new FMKID, the re-encrypted file. In an embodiment, accessing, using the new FMKID, the re-encrypted file comprises: generating a full file path using the new FMKID, and retrieving an encryption key associated with the new FMKID.

In an embodiment, during a rekeying cycle, the original FMKID and the new FMKID have a same persisted key ID value, and only the new FMKID has the mapping in the particular slice.

In an embodiment, the mapping is stored as a particular cache entry in a particular cache, and the particular cache expires a cache entry that is older than the period of time minus a buffer period of time.

Figure 9:
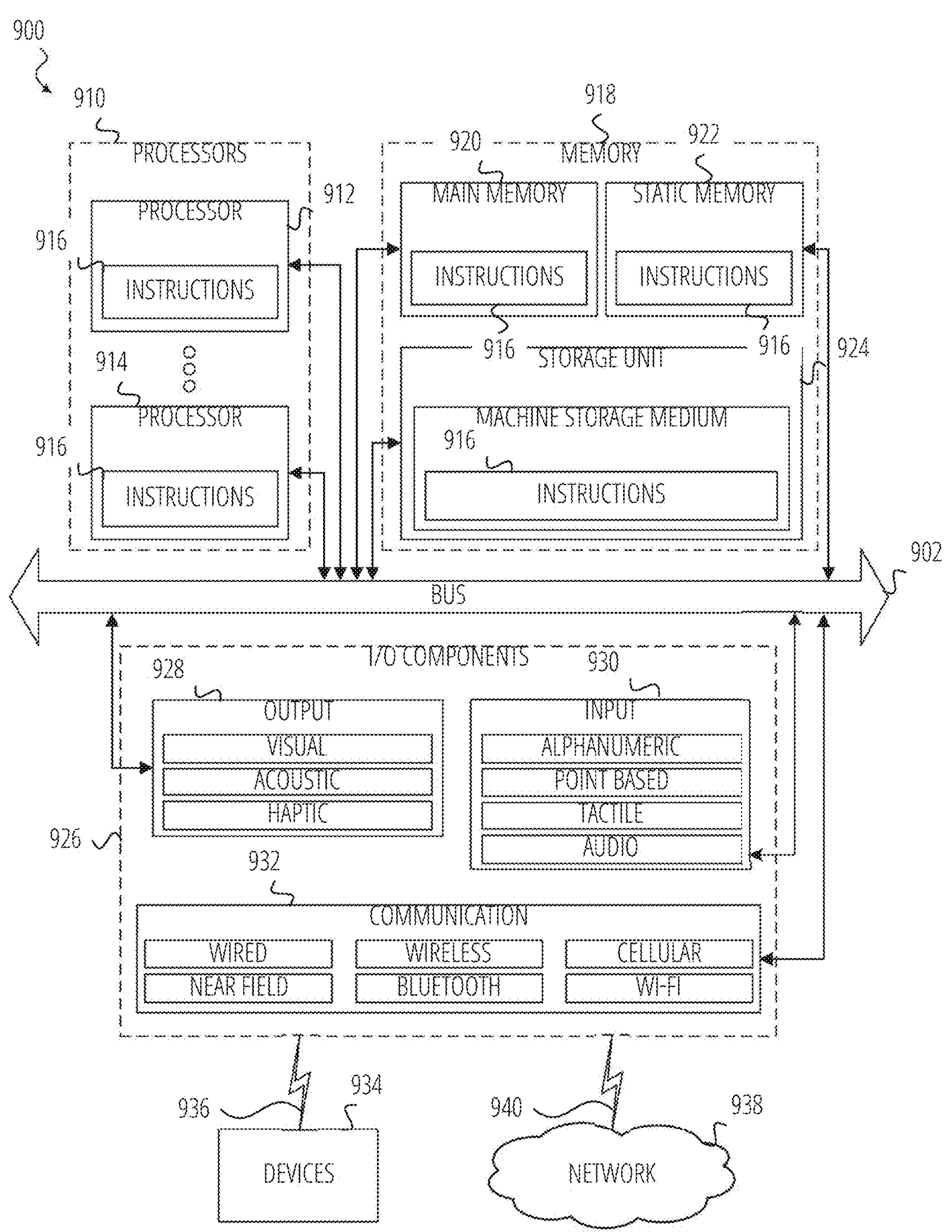
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the 900 in the example form of a computer system, within which instructions 916 (e.g., a software, a program, an application, an applet, an app, or other executable code) for causing the machine 900 to perform any one or more of the methodologies discussed herein may be executed. For example, the instructions 916 may cause the machine 900 to execute any one or more operations of the method(s)

described before. As another example, the instructions 916 may cause the machine 900 to implement any one or more portions of the functionality illustrated in any one of at least some of the figures described herein. In this way, the instructions 916 transform a general, non-programmed machine into a particular machine that is specially configured to carry out any one of the described and illustrated functions of the data platform 102 such as the compute service manager 108 (or a component thereof such as the DML engine 109) or an execution node of the execution platform 110.

In some embodiments, the machine 900 operates as a standalone device or may be coupled (e.g., networked) to other machines. In a networked deployment, machine 900 may operate in the capacity of a server machine or a client machine in a server-client network environment or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 918, and i/o components 926 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 918 may include a main memory 920, a static memory 922, and a storage unit 924, all accessible to the processors 910 such as via the bus 902. The main memory 920, the static memory 922, and the storage unit 924 store the instructions 916 embodying any one or more of the methodologies or functions described herein. The instructions 916 may also reside, completely or partially, within the main memory 920, within the static memory 922, within the storage unit 924, within at least one of the processors 910 (e.g., within the processor's cache memory), or any suitable combination thereof, during execution thereof by the machine 900.

The i/o components 926 include components to receive input, provide output, produce output, transmit information, exchange information, capture measurements, and so on. The specific i/o components 926 that are included in a particular machine 900 will depend on the type of machine. For example, portable machines such as mobile phones will likely include a touch input device or other such input mechanisms, while a headless server machine will likely not include such a touch input device. It will be appreciated that the i/o components 926 may include many other components that are not shown in FIG. 9. The i/o components 926 are grouped according to functionality merely for simplifying the following discussion and the grouping is in no way limiting. In various example embodiments, the i/o components 926 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The i/o components 926 may include communication components 932 operable to couple the machine 900 to a network 938 or devices 934 via a coupling 940 and a coupling 936, respectively. For example, the communication components 932 may include a network interface component or another suitable device to interface with the network 938. In further examples, the communication components 932 may include wired communication components, wireless communication components, cellular communication components, and other communication components to provide communication via other modalities. The devices 934 may be another machine or any of a wide variety of peripheral devices (e.g., a peripheral device coupled via a universal serial bus (USB)). For example, as noted above, the machine 900 may correspond to any one of the compute service manager 108, the execution platform 110, and the devices 934 may include the data store 206 or any other computing device described herein as being in communication with the data platform 102 or the data storage 104.

The various memories (e.g., memory 918, main memory 920, static memory 922, and/or memory of the processor(s) processors 910 and/or the storage unit 924) may store one or more sets of instructions 916 and data structures (e.g., software) embodying or utilized by any one or more of the methodologies or functions described herein. These instructions 916, when executed by the processor(s) processors 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 938 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 938 or a portion of the network 938 may include a wireless or cellular network, and the coupling 940 may be a Code Division Multiple Access (CDMA) connection, a Global System for Mobile communications (GSM) connection, or another type of cellular or wireless coupling. In this example, the coupling 940 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 938 using a transmission medium via a network interface device (e.g., a network interface component included in the communication components 932) and utilizing any one of a number of well-known transfer protocols (e.g., hypertext transfer protocol (HTTP)). Similarly, the instructions 916 may be transmitted or received using a transmission medium via the coupling 936 (e.g., a peer-to-peer coupling) to the devices 934. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

storing an original file master key identifier (FMKID) in metadata associated with an encrypted file, the encrypted file including data;

determining that the encrypted file is to be re-encrypted based at least on a period of time since the original FMKID was stored;

re-encrypting the data to generate re-encrypted data using a new encryption key associated with a new FMKID;

generating a mapping from the original FMKID to the new FMKID; and storing the mapping in a metadata database, the mapping being associated with a re-encrypted file, the re-encrypted file including the re-encrypted data, the mapping being stored in a particular slice of a key data persistence object, wherein the key data persistence object includes a persisted key identifier (ID), and wherein the persisted key identifier (ID is utilized to maintain the particular slice and perform a reverse lookup operation.

2. The system of claim 1, wherein the operations further comprise:

receiving a query statement to access the encrypted file;

retrieving the original FMKID from the metadata;

determining, using the mapping, the new FMKID; and accessing, using the new FMKID, the re-encrypted file.

3. The system of claim 2, wherein accessing, using the new FMKID, the re-encrypted file comprises:

generating a full file path using the new FMKID; and retrieving an encryption key associated with the new FMKID.

4. The system of claim 1, wherein during a rekeying cycle, the original FMKID and the new FMKID have a same persisted key ID value, and only the new FMKID has the mapping in the particular slice.

5. The system of claim 1, wherein the period of time comprises a particular number of days and a buffer period of time.

6. The system of claim 1, wherein the mapping is stored as a particular cache entry in a particular cache.

7. The system of claim 6, wherein the particular cache expires a cache entry that is older than the period of time minus a buffer period of time.

8. The system of claim 1, wherein the operations further comprise:

for a subsequent rekeying operation on the re-encrypted file, updating the mapping to directly link the original FMKID to a latest FMKID, without creating a chain of key mappings.

9. A method comprising:

storing an original file master key identifier (FMKID) in metadata associated with an encrypted file, the encrypted file including data;

determining that the encrypted file is to be re-encrypted based at least on a period of time since the original FMKID was stored;

re-encrypting the data to generate re-encrypted data using a new encryption key associated with a new FMKID;

generating a mapping from the original FMKID to the new FMKID; and storing the mapping in a metadata database, the mapping being associated with a re-encrypted file, the re-encrypted file including the re-encrypted data, the mapping being stored in a particular slice of a key data persistence object, wherein the key data persistence object includes a persisted key identifier (ID), and wherein the persisted key identifier (ID) is utilized to maintain the particular slice and perform a reverse lookup operation.

10. The method of claim 9, further comprising:

receiving a query statement to access the encrypted file;

retrieving the original FMKID from the metadata;

determining, using the mapping, the new FMKID; and accessing, using the new FMKID, the re-encrypted file.

11. The method of claim 10, wherein accessing, using the new FMKID, the re-encrypted file comprises:

generating a full file path using the new FMKID; and retrieving an encryption key associated with the new FMKID.

12. The method of claim 9, wherein during a rekeying cycle, the original FMKID and the new FMKID have a same persisted key ID value, and only the new FMKID has the mapping in the particular slice.

13. The method of claim 9, wherein the period of time comprises a particular number of days and a buffer period of time.

14. The method of claim 9, wherein the mapping is stored as a particular cache entry in a particular cache.

15. The method of claim 14, wherein the particular cache expires a cache entry that is older than the period of time minus a buffer period of time.

16. A non-transitory computer-storage medium comprising instructions that, when executed by one or more processors of a machine, configure the machine to perform operations comprising:

storing an original file master key identifier (FMKID) in metadata associated with an encrypted file, the encrypted file including data;

determining that the encrypted file is to be re-encrypted based at least on a period of time since the original FMKID was stored;

re-encrypting the data to generate re-encrypted data using a new encryption key associated with a new FMKID;

generating a mapping from the original FMKID to the new FMKID; and storing the mapping in a metadata database, the mapping being associated with a re-encrypted file, the re-encrypted file including the re-encrypted data, the mapping being stored in a particular slice of a key data persistence object, wherein the key data persistence object includes a persisted key identifier (ID), and wherein the persisted key identifier (ID) is utilized to maintain the particular slice and perform a reverse lookup operation.

* * * * *